United States Patent [19]

Englert et al.

[11] 3,721,967

[45] March 20, 1973

[54] HEAD CARRIAGE ASSEMBLY FOR MAGNETIC DISK STORAGE DRIVE

[75] Inventors: Ralph A. Englert, Monte Sereno; Ronald F. Fasano, Los Gatos; Darrell D. Palmer, San Jose, all of Calif.

[73] Assignee: International Business Machine Corporation, Armonk, N.J.

[22] Filed: Aug. 2, 1971

[21] Appl. No.: 168,238

[52] U.S. Cl. ................................340/174.1 C, 308/6

[51] Int. Cl. ............................................G11b 21/08

[58] Field of Search ......................308/6; 340/174.1 C

[56] References Cited

UNITED STATES PATENTS

| | | | |
|---|---|---|---|
| 2,762,663 | 9/1956 | Sloyan | 308/6 R |
| 3,587,075 | 6/1971 | Brown et al | 340/174.1 C |
| 3,470,399 | 9/1969 | Johnson et al. | 340/174.1 C |
| 3,521,092 | 7/1970 | Kalthoff | 340/174.1 C |
| 3,576,454 | 4/1971 | Beach et al. | 340/174.1 C |

*Primary Examiner*—J. Russell Goudeau
*Attorney*—Nathan N. Kallman et al.

[57] ABSTRACT

A carriage assembly useful with a head accessing mechanism in a magnetic disk storage system includes a base having parallel guide rails disposed in a triangular type configuration. The rails cooperate with a carriage body having a first set of bearings for riding on the top surface of the guide rails, and additional angled bearings that engage corresponding angled portions of the guide rails inboard of the periphery of the base. At least one of the angled bearings is spring loaded. The configuration is symmetrical about a vertical plane that is coincident with the direction of the axis along which the accessing mechanism travels.

7 Claims, 4 Drawing Figures

PATENTED MAR 20 1973 3,721,967

*INVENTORS*
RALPH A. ENGLERT
RONALD F. FASANO
DARRELL D. PALMER

BY Nathan N. Kallman

ATTORNEY

HEAD CARRIAGE ASSEMBLY FOR MAGNETIC DISK STORAGE DRIVE

CROSS REFERENCE TO RELATED APPLICATIONS

In U.S. Pat. No. 3,521,092, entitled "Data Storage Extended Stroke Actuator," issued July 21, 1970, to C. H. Kaltoff, an actuator means for driving an asymmetrical head carriage assembly is disclosed.

BACKGROUND OF THE INVENTION

1. Field of the Invention

This invention relates to a novel and improved carriage assembly, and in particular to a symmetrical, balanced cart that is useful for carrying a multiplicity of magnetic head arms for accessing rotating magnetic disks in a storage system.

2. Description of the Prior Art

In some magnetic disk storage systems that utilize magnetic head arm assemblies for accessing record disks, head assemblies are mounted to a block that is supported by a carriage driven bidirectionally by an actuator. The trend has been to provide more closely spaced data tracks on each disk surface in order to increase the storage capacity of the system and to reduce access time. As the tracks are spaced more closely, it is important that the accessing mechanism be controlled more precisely so that the heads, which are generally the flying noncontact type, are located accurately over a selected track. If the heads are accurately located relative to the data tracks, then the signal may be recorded and read at a proper amplitude and without distortion.

Due to mechanical instabilities, it has been found that the head assemblies may be displaced from the path of the data track, and therefore complex and costly servosystems are used to effect the desired track alignment. However, servosystem electronics have been found to be very sensitive to mechanical vibrations which appear when moving the head assemblies and associated mechanical structures radially and stopping the mechanism when the heads arrive at a selected data track or cylinder. Such vibrations, particularly in the radial direction, may reduce or negate the effectiveness of the servosystem, and are critical to system performance.

SUMMARY OF THE INVENTION

An object of this invention is to provide a novel and improved carriage assembly that is symmetrical about a vertical plane and balanced.

Another object is to provide a carriage assembly that operates with minimal vibration and eliminates undesirable resonance.

In accordance with a particular embodiment of this invention, a carriage assembly that is useful for transporting head assemblies in an accessing type disk drive includes a carriage base and a cart equipped with ball bearings for cooperating with guide rails formed on said base. A first set of three bearings rides on the top surfaces of the guide rails, the bearings and rails being disposed in a triangular configuration. The guide rails are parallel to the longitudinal axis of the cart and the base, such longitudinal axis defining the path of bidirectional travel of the cart. A second set of two pairs of bearings located at a lower level is angled relative to the top three bearings, the front pair of bearings being angled oppositely to the rear pair of bearings. All the angled bearings ride inboard of the peripheral surfaces of the carriage base, and engage sloped sides of the guide rails while the upper three bearings ride on the top flat surfaces of the rails. In this particular embodiment, two of the angled ball bearings, one front and one rear, are spring-loaded and tensioned against their associated inboard sloped sides.

BRIEF DESCRIPTION OF THE DRAWINGS

The invention will be described in greater detail with reference to the drawings in which.

Similar elements are designated by similar reference numerals throughout the drawing.

DESCRIPTION OF THE PREFERRED EMBODIMENT

Figures 1, 2, 3A, 3B:
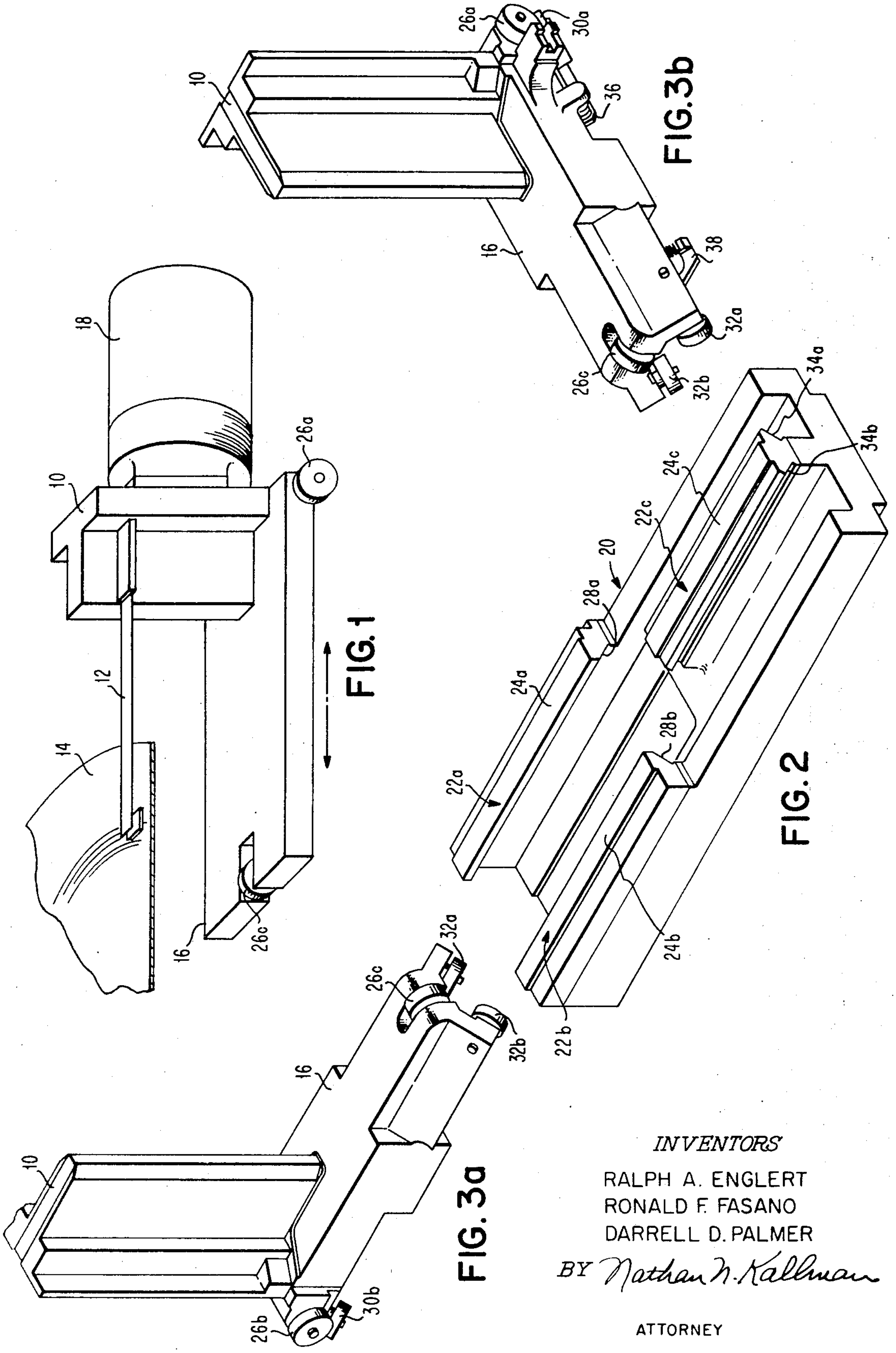
FIG. 1 is a three-dimensional schematic diagram, representing the significant parts of a magnetic disk file, including a portion of the cart used with the carriage assembly, in accordance with this invention.
FIG. 2 is an isometric view of the carriage base that cooperates with the cart portion; and FIGS. **3*a* and 3*b*** are isometric views of a particular configuration of a cart assembly, including the T-block employed for mounting head assemblies for use in a disk file.

With reference to FIG. 1, a representation of the major elements of a magnetic disk file is shown, including a head support structure or T-block 10 carrying a plurality of magnetic head arm assemblies 12 for accessing magnetic record disks 14. For simplicity and convenience, only one head arm assembly is illustrated and a breakaway portion of only one disk is depicted. The T-block 10 is mounted to a carriage assembly 16, and is also attached to a linear actuator 18, such as a linear D.C. motor or voice coil motor.

The voice coil 18 receives command signals from a central processing unit or control unit (not shown), and is adapted to move bidirectionally for a predetermined finite distance in response to each command signal. The T-block 10 and carriage assembly 16 are transported accordingly, so that the head assembly 12 arrives at a precise position over a selected data track of the record disk. When the T-block and carriage assembly are held stationary, the head arm assembly is positioned over a selected data track in transducing relation with the rotating disk, whereby data is recorded or reproduced.

The carriage assembly is mounted to a base structure 20 (see FIG. 2) that has guide rails **22*a*, *b*, *c* for guiding the carriage or cart radially relative to the rotating disk. The linear guide rails 22 are parallel to each other and to the longitudinal axis of the base 20, the forward rail 22*c* being centrally disposed so that its longitudinal axis is in alignment with that of the base. The rear guide rails 22*a*, *b* are so spaced to define a triangular type configuration with the forward rail 22*c***.

The guide rails 22 each have a flat upper surface **24*a*, *b*, *c* on which roller bearings 26*a*, *b*, *c* (see FIGS. 1 and 3) respectively ride during travel of the cart 16. The front rail 22*c* is Y-shaped, while the rear rails 22*a*, *b*** are rectangular, U-type to form a high stress area.

The rear guide rails **22*a* and 22*b* also have sloped sides 28*a***, *b* that serve to engage angled ball bearings **30*a***, *b*. The sloped sides 28 and rear bearings 30 are disposed inwardly or inboard of the carriage base periphery, thereby permitting a reduction of mass of the movable cart. In addition, front angled bearings **32*a***, *b* are provided to cooperate with opposing sloped sides **34*a***, *b* formed with the forward center guide rail. This combination acts to eliminate wobble and spurious vibrations that have been found to exist in prior art cart assemblies of this type.

To maintain an intimate contact between the cart 16 and the base 20, the lower angled rear and front bearings **30*a* and 32*a* are tensioned by spring-loaded arms 36 and 38 against the sloped rails sides 28*a* and 34*a***. The spring loading provides additional force to counter any tendency for the cart to wobble, and minimizes vibrational effects.

As a result of the combination and configuration of parts of this novel assembly, vibration of the head supporting T-block and cart assembly has been reduced substantially. The structure and symmetry of the carriage assembly affords a high degree of stiffness and rigidity in the critical radial direction, and the carriage is not sensitive to side motion. In effect, the side motion is uncoupled from the radial modes of vibration by virtue of the symmetry provided. The vibrations that are experienced are of minimal amplitude and of a relatively high resonant frequency, which is substantially above the critical resonant frequency of the operating system, particularly that of the servosystem electronics. It should be noted that these features are obtained without any significant increase in mass or weight of the carriage assembly.

What is claimed is:

1. A disk storage apparatus having a carriage assembly for supporting magnetic heads that access selected data tracks on magnetic disks comprising:

a carriage support base having a central longitudinal axis defining a direction of travel including a first front guide rail extending along and centered on said longitudinal axis, and second and third spaced rear guide rails disposed parallel to said first guide rail symmetrically about said axis, said three guide rails having flat top surfaces, said second and third rails having inner sloped surfaces along the sides closer to said axis, the first rail having sloped surfaces along each of its sides; and a movable cart being substantially symmetrical about said longitudinal axis, having a first set of roller bearings for travel along said flat rail surfaces, and a second set of angled roller bearings for engaging the inner sloped surfaces of said second and third rails, and the sloped surfaces of the sides of said first rail.

2. A disk storage apparatus as in claim 1, wherein said second set of bearings is located in a lower horizontal plane than said first set of bearings.

3. Apparatus as in claim 1, wherein said second set of bearings comprises a pair of front bearings and a pair of rear bearings, the bearings being angled in opposition to each other.

4. Apparatus as in claim 3, wherein one of said front bearings and one of said rear bearings are spring-loaded to maintain close contact with its associated sloped side portion.

5. Apparatus as in claim 1, further including:

magnetic disk means spaced from said carrier support base;

means for supporting at least one magnetic head arm assembly, mounted to said cart; and an actuator for moving said cart and supporting means bidirectionally so that at least one head arm assembly accesses selected data tracks of said disk means.

6. Apparatus as in claim 5, wherein said actuator is a linear D.C. motor.

7. Apparatus as in claim 5, wherein said supporting means is a T-block type assembly.

* * * * *